United States Patent [19]

Lermuzeaux

[11] 4,265,921
[45] May 5, 1981

[54] PROCESS FOR QUICK-FREEZING OF FOOD PRODUCTS

[75] Inventor: André Lermuzeaux, Sucy-en-Brie, France

[73] Assignee: L'Air Liquide, Societe Anonyme pour l'Etude l'Ecploitation des Procedes Georges Claude, Paris, France

[21] Appl. No.: 897,534

[22] Filed: Apr. 18, 1978

[30] Foreign Application Priority Data

Apr. 25, 1977 [FR] France ............................ 77 12339

[51] Int. Cl.³ .............................................. A23L 3/36
[52] U.S. Cl. .................................... 426/444; 426/524
[58] Field of Search ............... 426/524, 519, 444, 327, 426/249, 100, 66, 67; 62/10

[56] References Cited

U.S. PATENT DOCUMENTS

| 1,927,175 | 9/1933 | Josephson | 426/524 |
| 3,928,646 | 12/1975 | Cannell | 426/524 |
| 3,932,155 | 1/1976 | Pietvucha et al. | 426/524 |
| 3,958,031 | 5/1976 | Fleck et al. | 426/424 |

Primary Examiner—Hiram Bernstein
Attorney, Agent, or Firm—Browdy and Neimark

[57] ABSTRACT

Quick-freezing of food products in liquid or paste form is achieved by mixing the food with an excess of carbon dioxide snow. A finely divided carbon dioxide snow bed is formed in situ by stirring and then there is brought into contact with the resultant bed of carbon dioxide snow particles the food product in a paste or liquid state, divided on contact with the snow, until the granules of the food product are formed. The process can be used in various apparatus and is applicable in the industrial food field and for making of products intended for home consumption.

11 Claims, 3 Drawing Figures

PROCESS FOR QUICK-FREEZING OF FOOD PRODUCTS

FIELD OF THE INVENTION

The present invention relates to a process and apparatus for use in rapid freezing of pasty or liquid food products for industrial use and for making of products intended for home consumption.

BACKGROUND OF THE INVENTION

In the present state of the art, viscous food liquids or products are frozen in containers of variable volume, from 250 ml., for example, for concentrated fruit juices to 10 or 20 liters for egg yokes, in containers of plastic or other materials, and even 30 to 50 liters for orange juice packaged in plastic bags.

Freezing foods in flake or chip form the use of cooled cylinders or the like has not been adapted to the products considered. It is suitable only for liquids with slight viscosity, such as water, for example. Viscous food liquids and products are therefore treated with the technique of freezing in units.

Freezing in units of viscous food liquids and products, according to the present industrial practice, has several drawbacks.

In all cases, the product subject to freezing treatment is put in a package. Now, any packaging is burdensome and all the more so, the smaller the unit volume.

Further, freezing and thawing are slow. Thus, unit freezing of bags of orange juice of 30 to 50 liters requires a stay of 24 to 48 hours in cold storage, and that of eggs in containers about 48 hours. During these prolonged freezing periods, the food products run the risk of evolving and changing during these operations. In the case of thawing, an increase of the speed of the latter can cause overheating and a deterioration of the quality of the product, for example, if a thawing of a unit of soup with the usual cooking means is involved.

Further, it is necessary to thaw the entire unit because it is difficult to fragment it, which prevents the practical use of small amounts of the product. For the same reason, mixtures of products in the frozen solid state cannot be achieved, whereas this technique should be able to be used to make different proportions of products that are finished or to be transformed.

SUMMARY OF THE INVENTION

A process has now been found which makes it possible to mitigate the drawbacks of unit freezing. This new process, which leads to obtaining almost instantaneously frozen products in granules, is suited to industrial applications and manufacture for home consumption.

Quick freezing of food products, under regular, excellent cooling conditions, is an advantage for the consumer. The offering of a frozen food product in the form of particles gives the consumer the possibility of removing only the above intended for immediate use. It also assures him of fast thawing of the food which eliminates any alteration of the quality. Thus, the user will be able to take the amount of frozen orange juice necessary for preparing a glass of fruit juice and, immediately after adding water, to consume the beverage which is ready to drink. In the case of unit freezing of a can of orange juice, the consumer must wait about two hours before diluting the juice; the normal thawing period for the contents of a can. Also, the drawbacks of thawing soups in units are eliminated.

The new technique makes it possible to mix different constituents in the desired proportions. It is possible to make mixtures of fruit juices and concentrates or purees of several fruits and vegetables, and to make soups with various ingredients.

DESCRIPTION OF PREFERRED EMBODIMENTS

Figures 1, 2:
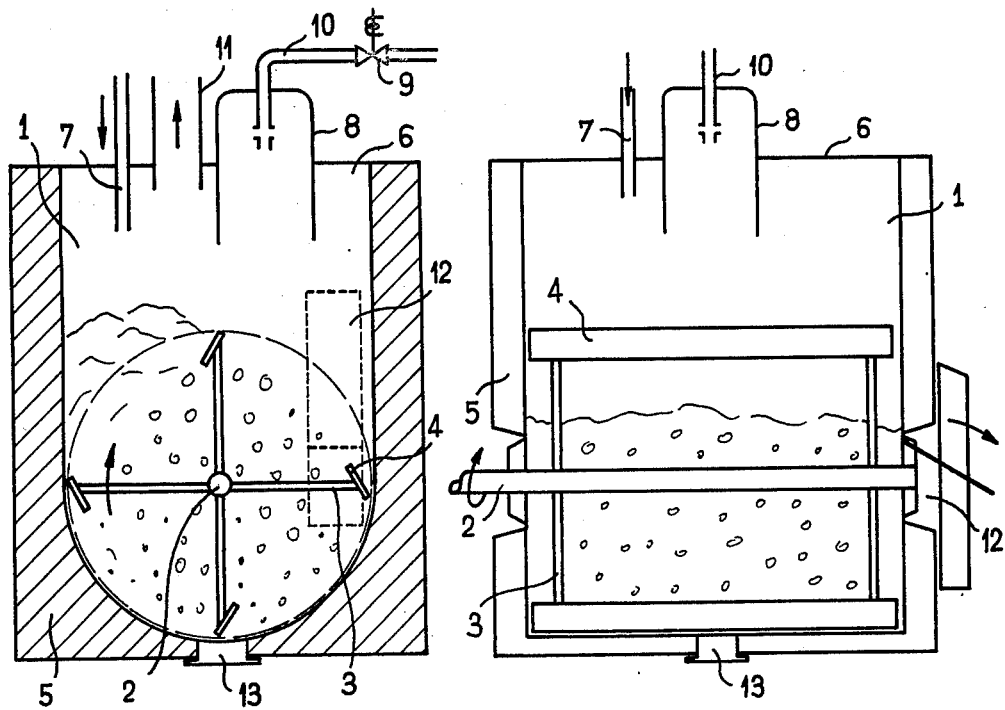
FIG. 1 is a vertical cross-sectional view of the apparatus.
FIG. 2 is an axial cross-sectional view thereof.

According to the present invention, a process of fast freezing of food products is obtained by mixing the food product with an excess of carbon dioxide snow. A bed of finely divided carbon dioxide snow is formed in situ by stirring liquid $CO_2$ while reducing pressure to cause expansion and change in phase from liquid to solid; and the food product in the liquid or paste state is brought into contact with the bed of carbon dioxide particles and mixed therewith, and the food product is thus divided on contact with the carbon dioxide snow, until granules of the food product are formed.

Depending on its viscosity, the food product to be frozen can be introduced in bulk and its division performed on contact and mixture with the carbon dioxide snow bed by the effect of the contact; it can also be divided above the carbon dioxide snow bed.

The carbon dioxide snow and food product are introduced continuously, while at the same time continuously removing the frozen product in granular form and the gaseous carbon dioxide coming from sublimation of the carbon dioxide snow.

Sublimation of the solid carbon dioxide snow in contact with the viscous liquid product is very important; freezing of the food product is extremely quick and the liquid food nourishes the already frozen particles that are in the mixing zone. The product permits the obtaining of particles separated into granules of variable size, the diameter of the granules being between 5 and 15 mm.

The gaseous carbon dioxide resulting from the sublimation of the carbon dioxide snow can be recycled after compression and liquefaction by cooling and then expansion.

The period of contact of the product to be quick-frozen with the carbon dioxide snow and the rate of mixing are a function of the size desired for the particles. Therefore, it is possible to cause a variation of the diameter of the granules by controlling the contact time or the mixing speed: particles are larger when the contact time increases and are finer when the mixing is faster and vice versa. Advantageously, the contact time is on the order of some minutes, preferably between 1 and 10 minutes. An increase of the mixing speed on the order of 1 to 2 has a notable impact on the diameter of the granules. With a linear speed of the mixing means of 0.80 meter/second, particles of 10 to 15 mm are obtained, while with a double speed of 1.60 meter/second leads to smaller particles of 5 to 10 mm. A speed of between 0.3 and 2 meters/second is preferred.

The dimensions of the granules are also a function of the viscosity of the product to be frozen; the granules are large and irregular when the product has a high viscosity. These dimensions are also a function of the aptitude of the product for freezing; the grains are small when the product is difficult to freeze. The process is applicable to a wide range of viscosity from aqueous products with a slight viscosity to products with a high viscosity that can amount to 60 poises. When a viscous liquid is frozen, the heat exchange with the carbon dioxide snow is reduced to an exchange between solids and it is possible to obtain a large temperature difference between the carbon dioxide snow and the grains of the frozen product. Although the sublimation temperature of the carbon dioxide is $-78.9°$ C., the grains of the frozen food products, after stabilization of the temperature, can be removed at temperatures from $-70°$ to $-18°$ C., for example, corresponding to the usual temperatures for storing frozen foods.

The output of the product to be frozen is considerable and varies as a function of the viscosity of the liquid to be frozen, decreasing when the viscosity increases. With aqueous products, it is possible to freeze 10 liters per hour per liter of capacity of the mixing apparatus, for example, 250 liters/hour for a mixer with a 25-liter capacity. The yield is large because the abrasion of the frozen product is slight during the operation.

The carbon dioxide snow used in the process can be produced by expansion of liquid carbon dioxide. The expansion supplies gaseous carbon dioxide and carbon dioxide snow.

It is possible to envisage use of gaseous carbon dioxide in a closed circuit, by means of a reliquefaction installation. This reliquefaction is performed in the standard way by compression in two stages, to 20 bars for example, then cooling to $-20°$ C. by a standard refrigeration installation with a cold-producing fluid such as ammonia or a fluoro hydrocarbon.

According to a variation of the invention, it is possible to proceed to a regulated addition of the product to be frozen. This addition of the product is intended to sublime the excess carbon dioxide snow and raise the temperature of the granules of the frozen product before their removal; it is regulated by the removal temperature selected. This addition of liquid to be frozen can occur when the viscosity of the product allows, by spraying, either of the liquid alone, or of the liquid divided by carbon dioxide gas under pressure.

The process of freezing by mixing of the viscous product to be frozen is performed in at least one zone.

According to an advantageous mode, the mixing of the product is performed in three zones.

In the first zone, called the freezing zone, freezing of the viscous liquid food is assured by contact with the carbon dioxide snow. The input of the carbon dioxide snow in the first zone is regulated by the temperature of the second zone; the carbon dioxide snow always being in excess in the freezing zone.

The second zone is reserved for separating the frozen granules of suitable size from the fine snow and fine frozen particles. The fine particles that have been separated are sent back to the freezing zone.

In a third zone, where the agitation is less than in the freezing zone, the carbon dioxide is recovered by sublimation of the excess carbon dioxide snow and stabilization of the temperature of the frozen product is achieved by an additional input of product to be frozen regulated by the removal temperature selected for the frozen granules.

It is important to create a countercurrent circulation between the small and large granules of the frozen product, the small ones being sent back to the freezing zone and the large ones of suitable size being directed to the zone of stabilization of the temperature of the frozen product.

The process of the invention, simple and inexpensive to use, makes it possible to quick-freeze paste or liquid products with a high hourly output. It is particularly applicable to quick-freezing of all fruit and vegetable juices, fruit pulps and nectars, such as peaches, black currants, apricots, red currants, strawberries, raspberries, for preparation of ice cream and sherbert. The process is particularly suited for the preparation of tomato sauce and concentrate, puree of various vegetables such as carrots, whose pectin and color are preserved intact, spinach, onion, garlic. The process gives excellent results in preserving sauces, creams and soups and in the preservation of egg yolks for pastry. The process is also very advantageous in canning and preserving food to absorb the momentary overproduction at the time of harvest of fruits and vegetables such as tomatoes.

The apparatus for practicing the process can be simple or elaborate.

The simplest apparatus is that shown in FIGS. 1 and 2 of the accompanying drawing. The mixer comprises a horizontal semi-cylindrical trough 1 equipped in the longitudinal direction with a rotor 2 provided with non-oriented arms 3 ending in blades 4; this rotary unit is intended to perform the mixing of the paste or liquid food product. The trough is extremely well insulated with a standard insulation 5 such as injected polyurethane.

The apparatus is closed with a lid 6 thru which pass the pipe 7 for introducing the food product and the flared feed pipe 8 for the carbon dioxide snow; electrovalve 9 controls the intake of the liquid $CO_2$ carried by pipe 10 discharging into the flared feed pipe 8; stack 11 is provided for evacuation of the gaseous $CO_2$. An opening 12 is provided in the vertical outlet wall for removal of the frozen product and excess carbon dioxide snow. At the outlet of the apparatus a sieve is provided to recover the finer products and excess carbon dioxide snow for recycling to the mixer. (This arrangement is not shown in the figure). At the lower part of the trough, a drain 13 is provided for evacuation of the product remaining in the apparatus at the end of the operation.

Figure 3:
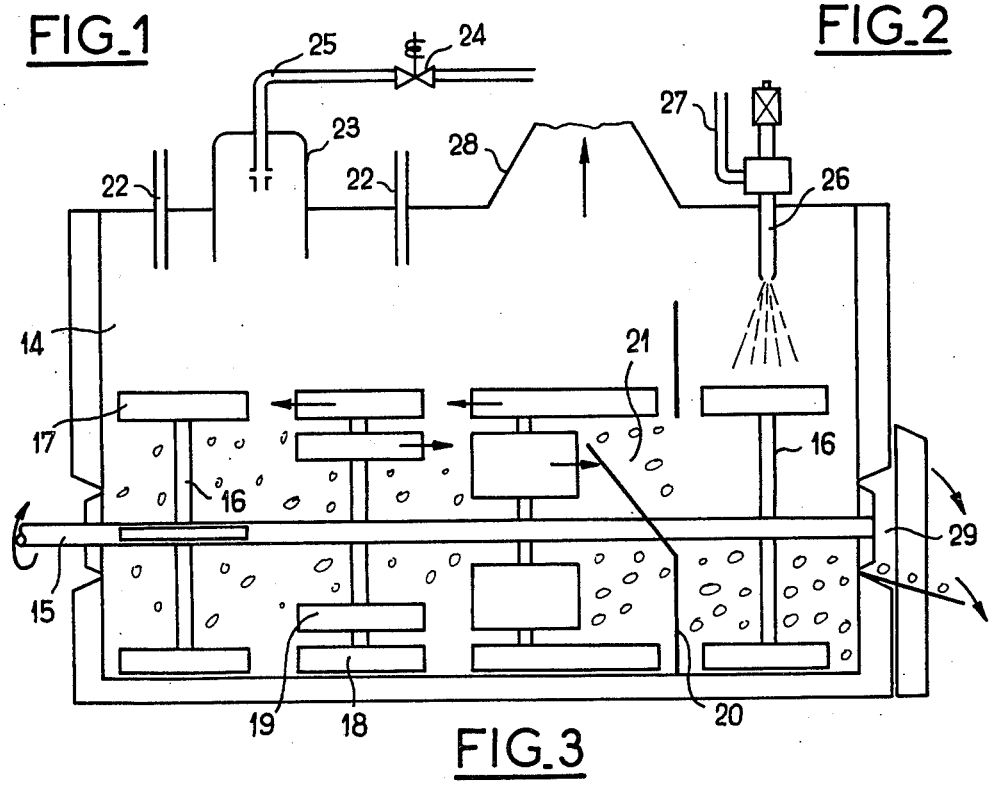
FIG. 3 is an axial cross-sectional view of a variant form of the apparatus.

FIG. 3 of the accompanying drawing shows an improved apparatus in which the horizontal semicylindrical mixer is extended and separated, in a more or less definite way, into zones corresponding to the three-stage variant of the process: freezing, separation of the frozen particles of suitable size and the fines of the carbon dioxide snow and frozen product, and sublimation of the excess carbon dioxide snow and stabilization of the temperature of the frozen product.

The apparatus comprises a large parallelipipedic vat 14, covered and insulated, and having a semi-cylindrical bottom along its entire length; the apparatus is equipped with a rotor 15 provided with arms 16 ending in blades 17 arranged so that the movement of the product in the input zone has a slight axial orientation. In the central part of the apparatus, the arms of the rotor carry a double series of blades; at their end a first series of peripheral blades 18, oriented so that the small particles of the frozen product are directed upstream to the preceding zone, and closer to the center a second series of blades 19 oriented so that the large particles of frozen product are directed downstream in the opposite direction to the output end part of the apparatus. In this latter zone, the number of arms of the rotor is small in relation to the input zone, and they carry only one series of blades.

The central and end parts of the apparatus are partially separated by a partition 20 and are connected by a chute 21 made in the partition.

In the input zone, the upper part of the apparatus is provided with pipes 22 for introduction of the food product regularly distributed around the flared pipe 23 for the carbon dioxide snow; electrovalve 24 controls the supply of liquid $CO_2$ circulating in pipe 25. The end upper part is equipped with a spray 26 for addition of liquid to be frozen, and the gaseous carbon dioxide under pressure is introduced at 27. The central upper part is provided with a device 28 for recovery of the carbon dioxide to an installation for compression and liquefaction by cooling, then expansion, for recycling the carbon dioxide, which is not shown in the figure.

In the end vertical wall is provided the removal sieve 29. The peripheral blades of the central zone directing the fine particles toward the input zone can be replaced by spirals with a suitable twist.

The mixer can be advantageously inclined by raising the input zone in relation to the output and to assure the flow of the large particles of the frozen product in the direction of the inclination of the mixer, the fine particles being sent back by the peripheral blades to the input zone.

As a variant, it is possible to use multiple mixers with a double or quadruple rotor; the various rotors being on the same horizontal plane make it possible to increase the production capacity.

The apparatus should be closed and the carbon dioxide transferred to the exterior by a chimney in case of use of the waste gas, but it is possible to maintain a high pressure in the apparatus so that air intakes are completely avoided, which is favorable to reliquefaction of the carbon dioxide gas.

Examples, which illustrate the invention is a non-limiting way, are given below.

EXAMPLE 1

In a mixer, according to FIG. 3, in which the capacity of the first zone is 25 L, tomato juice concentrate with 14% solids with a viscosity of 3 poises at 24° C. is frozen according to the following process. The carbon dioxide snow produced by expansion is poured in and mixed until a carbon dioxide bed is formed. The carbon dioxide snow is introduced at a rate of 0.8 kg. of snow per kg. of tomato concentrate. Then the juice of the tomato concentrate is poured in with a delivery of 200 l/h, which is divided by contact with the carbon dioxide snow bed.

The linear speed of the mixer arms is 1.30 meter/second. The freezing is instantaneous and the dwell time in the freezing zone is on the order of 6 minutes. Granules of 10 to 25 mm., fines of snow and product are directed to the separation zone where the temperature is on the order of −50° C. The outside blades send the fines less than 10 mm. back to the freezing zone, while the central blades direct the granules of suitable size of 10 to 25 mm. to the chute connected to the temperature stabilization zone. An additional injection is made by spraying with a delivery of 10 l/h. The temperature of the grains stabilizes at −20° C. and the frozen product is removed. The gaseous carbon dioxide is recycled after compression and liquefaction.

EXAMPLE 2

In a mixer of type 1 with a 25-liter capacity, spinach puree with a viscosity of 40 poises at 15° C. is frozen under the following conditions:

Carbon dioxide snow is poured into the mixer and mixed until a carbon dioxide bed is formed. The carbon dioxide snow is introduced at a rate of 0.8 kg. of snow per kg. of spinach puree. Then the spinach puree at 15° C. is poured onto the snow bed at a rate of 150 kg/hour; it becomes divided on contact with the snow bed.

The linear speed of the mixer arms is 1.90 meter/second. Freezing is instantaneous and the dwell time in the freezing zone in on the order of 8 minutes. The carbon dioxide snow removed from the mixer with the frozen spinach puree is small and more friable so that it is separated by sieving the frozen spinach granules of 60 to 10 mm., and the fine snow and small spinach grains are reintroduced into the mixer. The snow is reused and the small grains become larger by addition of spinach puree which freezes on their surface. As above, the operation is in a closed circuit and the carbon dioxide is recovered and recycled after reliquefaction.

It will be obvious to those skilled in the art that various changes may be made without departing from the scope of the invention and the invention is not to be considered limited to what is shown in the drawings and described in the specification.

What is claimed is:

1. A process for quick-freezing of food products by mixing a liquid or pasty food product with an excess of carbon dioxide snow, comprising
    forming a carbon dioxide snow bed in situ by feeding carbon dioxide liquid under pressure to a zone of lower pressure where it expands and solidifies, while applying a mixing force to the expanding and solidifying carbon dioxide, and adding to said snow bed the food product to be frozen and thereby bringing the food product into contact with the carbon dioxide snow particles by mixing with a mixing means so that the food product in paste or liquid state is divided on contact with the carbon dioxide snow and is quickly frozen, the linear speed of the mixing means being 0.3–2 m/sec.,
    maintaining mixing until frozen granules of said food product having a stabilized temperature between −70° and −18° C. are formed, and
    then removing the frozen granules.
2. Process of quick-freezing of food products according to claim 1, wherein the food product is introduced in bulk, the division taking place in the carbon dioxide bed by the effect of the mixing.
3. Process of quick-freezing of food products according to claim 1, wherein the food product is divided above the carbon dioxide bed.
4. Process of quick-freezing of food products according to claim 1, wherein the carbon dioxide snow and food product are introduced continuously, while the frozen product in granule form and the gaseous carbon dioxide coming from sublimation of the carbon dioxide snow are removed.
5. Process of quick-freezing of food products according to claim 4, wherein the gaseous carbon dioxide is recycled after compression and liquefaction after cooling then expansion.

6. Process of quick-freezing according to claim 1, wherein a regulated addition is made of the food product to be frozen so as to sublime the excess carbon dioxide snow and raise the temperature of the granules of the previously frozen product to the removal temperature, this addition being regulated by the desired removal temperature.

7. Process of quick-freezing according to claim 6, wherein the addition is made by spraying of the liquid food product.

8. Process of quick-freezing according to claim 6, wherein the addition is made by spraying of the liquid food divided by the gaseous carbon dioxide under pressure.

9. Process of quick-freezing according to claim 6, wherein mixing of the food product is performed in three zones, respectively, in a first zone for freezing where the product to be frozen is mixed with the carbon dioxide snow, then a second zone for separation of the frozen granules of suitable size, the fine snow and fines of frozen product, and a third zone of sublimation of the excess snow and stabilization of the temperature of the frozen product by an addition of the product to be frozen regulated by the removal temperature desired for the frozen granules.

10. Process of quick-freezing according to claim 9, wherein the input of the carbon dioxide snow in the first zone is regulated by the temperature of the second zone, and wherein there is created a countercurrent circulation between the small and large granules of frozen product, the small ones being sent back to the freezing zone and the large ones of suitable size being directed to the zone for stabilization of the temperature of the frozen product.

11. A process according to claim 1, wherein said mixing is carried out in a horizontal, semicircular, insulated mixer equipped in the longitudinal direction with a rotor provided with non-oriented arms ending in blades, said mixer being closed by a cover, said food product to be frozen being fed to said mixer, and said carbon-dioxide snow being fed to said mixer through a flared feed pipe, evacuating gaseous carbon dioxide from said mixer through a stack, said mixer also being provided with an outlet and drain.

* * * * *